United States Patent Office 3,549,521
Patented Dec. 22, 1970

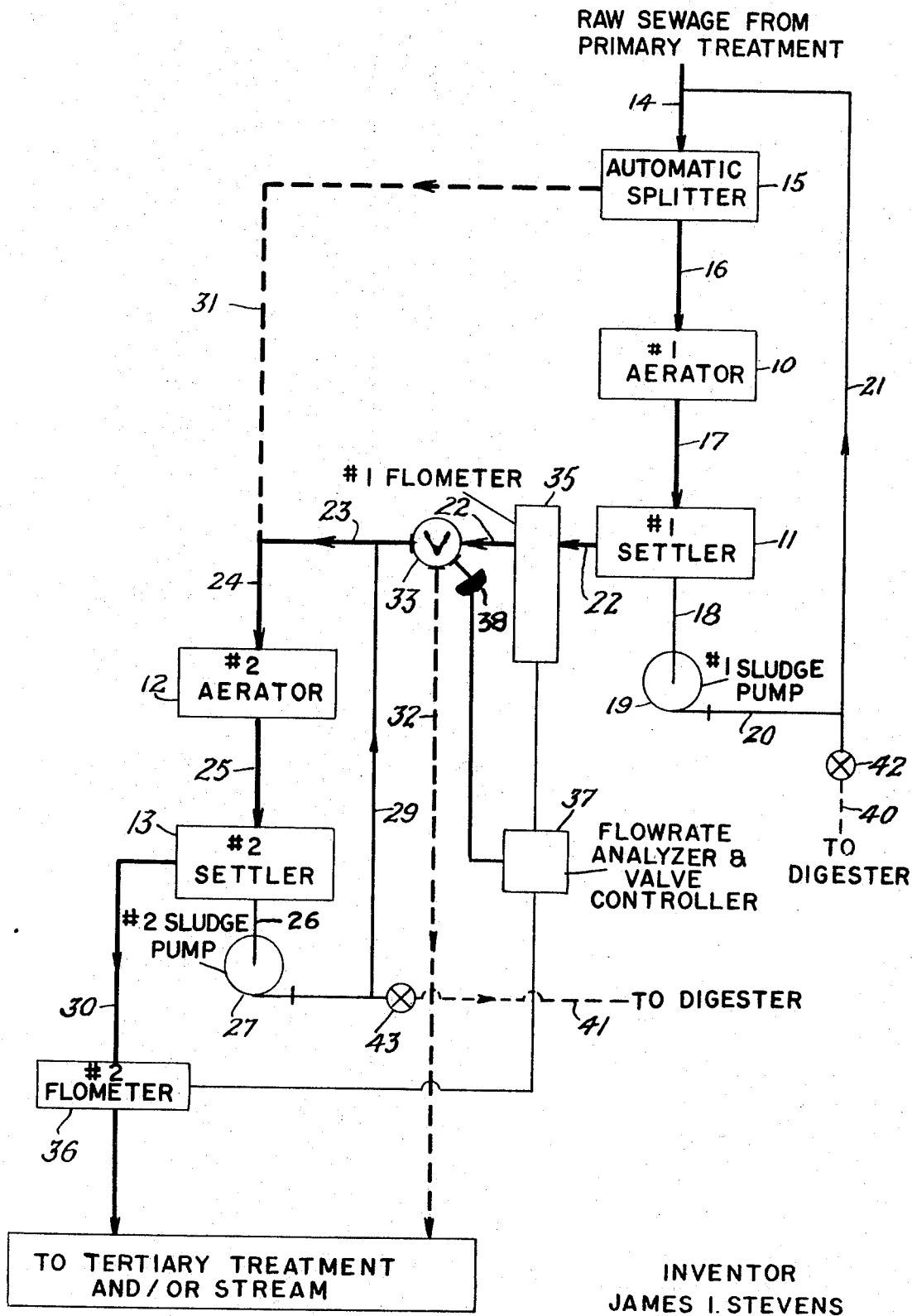

1

3,549,521
SEWAGE TREATMENT PROCESS AND SYSTEM
James I. Stevens, Bedford, Mass., assignor, by mesne assignments, to Nayadic Sciences Incorporated, West Chester, Pa., a corporation of Pennsylvania
Filed Sept. 5, 1969, Ser. No. 855,622
Int. Cl. C02c 1/08
U.S. Cl. 210—5
6 Claims

ABSTRACT OF THE DISCLOSURE

The present invention comprises a process and system for treating sewage employing first and second stage activated sludge treating units. These units are arranged in series under normal sewage input flow conditions. If excessive flow prevails, the portion of the influent in excess of a predetermined amount will bypass the first stage and be diverted directly to the second stage. Approximately the same amount of fluid flowing from the first stage to the second stage treating unit will be simultaneously diverted directly to the output of the system, bypassing the second stage treating unit.

This invention relates to an improved method and system of components for treating liquid wastes such as sewage that contain organic matter using the activated sludge technique. It is particularly useful in conjunction with the two stage method and system for sewage treatment of United States Letters Patent 3,186,939 issued June 1, 1965; the disclosures of said patent being expressly incorporated herein by reference. Conventional activated sludge installations can be adapted to use the improvement of this invention.

In the operation of a two stage activated sludge installation of the type illustrated in the drawing of the aforesaid 3,186,939 patent (hereinafter sometimes referred to as the Murray process or Murray system) total sewage, without separation of solid organic matter, is introduced into an aeration zone of a first treating unit, it is admixed with an oxygen containing gas under conditions to effect aerobic decomposition of the organic constituents of the sewage. The aerated sewage is then passed to a clarifying zone that is part of or associated with the first treating unit and wherein the activated sludge is permitted to settle. The settled sludge is collected, recirculated and intimately admixed with the raw sewage being fed to the aeration zone; the clarified sewage liquor from the first stage treatment is fed to a second treatment unit, constructed and operated similarly to the first stage. In the second stage, the clarified sewage liquor from the first stage is fed to the aeration zone and again admixed with oxygen containing gas under conditions to effect aerobic decomposition of the organic constituents. The aerated sewage from the second stage aeration zone then moves into the second stage clarifying zone where the activated sludge is permitted to settle. The activated sludge settled in the second stage clarifier is collected, recirculated and intimately admixed with the clarified sewage liquor from the first stage that is being introduced into the second stage aeration zone. The clarified liquid from the second stage unit is discharged from the system and thereafter it can either be subjected to tertiary treatments and/or chlorination or it can be discharged to the stream without further processing.

A more detailed description of the operation of the construction, operation and alternative capabilities of the modified two stage activated sludge system can be had by reference to the aforesaid 3,186,939 patent.

Although according to the 3,186,939 patent, the Murray system and process is capable of handling loads

2 considerably in excess of design capacity, nevertheless, surge loads frequently exceed the overload limits that can be effectively processed. These surge loads can be caused by many factors including randomly intermittent discharges from industrial plants (such as pulp and paper mills, chemical plants, textile mills, food processing plants, dairies, etc.) serviced by the sewer system; surge loads can increase not only the total fluid flow rate, but in many cases it can also increase the organic solid content and B.O.D. loadings of the sewage. Prolonged heavy rain and cloudbursts can induce overloads where a common line is used for both the sanitary and storm sewers. In addition, population growth, in the area served frequently gives rise to surge loadings at peak hours that exceed the maximum efficient design capability of the treating system.

Surge loads increase the hydraulic flow through the system and during periods where there is a large increase in volumetric flow through the units in the series arrangement normally contemplated by the Murray patent, the light flocs are frequently swept out of the system thereby reducing drastically the treatment effectiveness and greatly increasing the time needed to get back on stream once the flow rate has returned to normal.

Furthermore, when the Murray process and system is operated in the series arrangement the nature and concentration of the activated sludge in the first stage unit differs from that in the second unit, and there will be established entirely different food/microorganism ratios between the two units. The first stage treating unit will contain the more viable microorganisms at least with respect to their capability for rapidly assimilating increased waste loadings.

Therefore, it is an object of the present invention to provide a process and a component system that will permit rapid establishment of an optimum biological regime in the second stage unit of activated sludge plants such as that of the aforesaid Murray patent as the load increased.

It is another object of this invention to provide a system of equipment components and also a process that can be used in conjunction with activated sludge installations—such as that of the aforesaid Murray system—that have a plurality aeration and settling units arranged to normally operate serially, the improved system and process being adapted to automatically compensate for surge loads and prevent elutriation of activated floc material due to increased hydraulic flow and thereby enable the treatment system to handle the overload without any appreciable overall reduction of treating efficiency and to quickly and automatically return to its previous condition when flows return to normal.

Other objects and advantages of this invention will be pointed out and developed in the following portions of the specification.

In accordance with this invention, these objectives and advantages are accomplished as an improvement of a system for treating sewage in which the raw sewage influent is fed to and passed serially through first stage and second stage treating units. Each treating unit has an aeration zone in which the sewage is admixed with air or oxygen under conditions to form an activated sludge and a clarifying zone in which the activated sludge settles and separates from the supernatant liquor. The settled activated sludge from the first stage clarifying zone being collected, recirculated, and mixed with the raw sewage being fed to the first stage aeration zone. The supernatant liquor separated from the activated sludge in the first stage clarifying zone being collected and fed to the second stage aeration zone. The settled activated sludge from the second stage clarifying zone being collected, recirculated and mixed with the supernatant liquor being fed to the second stage aeration zone. The supernatant liquor separated from the activated sludge in the second stage clarifying zone being collected and discharged from the system. The specific improvement contemplated herein including the following arrangement of elements in combination with the component arrangement first described (1) means for splitting the flow of raw sewage are provided in the sewage influent feed line ahead of the first stage aeration zone, said means providing an influent bypass adapted to divert the portion of the flow of raw sewage influent in excess of a preset and predetermined maximum to the second stage aeration zone, (2) a first flow measuring means adapted to measure the flow rate of the supernatant liquor being fed from the first stage clarifying zone to the second stage aeration zone, (3) a second flow measuring means adapted to measure the flow rate of the supernatant being discharged from the second stage clarifying zone, (4) a valve controlled supernatant bypass to the system discharge connected to the flow path of the first stage supernatant feed to the second stage aeration zone beyond the first flow measuring means and ahead of the second stage aeration zone, and (5) a flow-rate analyzer, adapted to sense differences in the flow rates of the supernatants discharging from the first and second units and set to actuate the supernatants bypass valve whenever the flow rate at the second flow measuring means exceeds the flow rate at the first flow measuring means to thereby decrease the quantity of supernatant being fed from the first stage clarifying zone to the second stage aeration zone in an amount approximately equal to the quantity of raw sewage influent being bypassed by the flow splitting means from the first stage unit to the second stage unit.

The improvement of my invention will be better understood by reference to the accompanying drawing showing schematically the automatic cross connection arrangement that enables activated sludge systems such as two stage Murray system to compensate for surge loads.

In the drawing, a raw sewage influent is shown entering the system after it has been subjected to any desired conventional primary treatment including operations to remove large floating or suspended solids that might damage equipment or otherwise interfere with plant operation, and comminution to grind up suspended solids to digestable size.

The cross connection arrangement contemplated by the invention is illustrated in the drawing in connection with a two stage treatment system that includes a first stage treatment unit and a second stage treatment unit, each treatment unit having an aeration zone and a settling zone. These zones, may, as in the system shown in the drawing of the aforementioned Murray patent combined in a single piece of equipment in which the aeration zone is surrounded by the clarifying zone and both zones being superimposed on a settling zone or can be in physically separated pieces of equipment.

In normal operation, the two treatment units are operated in series. Liquor flowing first to the first stage aeration zone 10, passing next to the first stage settling zone or clarifying zone 11. It is then fed to the second stage aeration zone 12, passing therefrom to the second stage settling or clarifying zone 13 and then being discharged from the system. For purposes of understanding this invention the exact construction details of the treating units and the operational parameters are not particularly significant except to the extent that the system has the specified flow path. Persons skilled in the activated sludge treatment art will be fully apprised of necessary construction details and operating essentials for efficient sewage treatment.

The influent raw sewage liquor containing the sewage solids normally associated therewith is fed to the activated sludge plant through line 14, passes through a jump wier or other automatic splitter mechanism 15. The splitter is arranged so that up to a preset and predetermined flow rate, all sewage liquor is automatically channeled through line 16 and excess influent through line 31. From line 16 the influent goes to the first stage aeration unit 10 where the sewage is thoroughly mixed with air or other oxygen containing gas under conditions conductive to aerobic decomposition of the organic material and thereby form a highly viable activated sludge floc. Aerated sewage liquor containing activated sludge moves through channel 17 into the settler where the floc is maintained under quiescent conditions which permits activated sludge to settle without appreciable elutration and collect at the bottom of the settler unit. The activated sludges is continuously removed from the settler unit through line 18 by the #1 sludge pump 19 and recirculated through the first stage unit by means of lines 20 and 21. Return line 21 is positioned to admix the recycled sludge with the incoming sewage ahead of the inlet to the splitter box 15. This arrangement of the recycling flow channel uniformly disperses recycled activated sludge with the incoming raw sewage and is especially important when the system is operating in parallel in order to instantaneously insure the presence of sufficient quantities of highly viable activated sludge in the raw sewage being bypassed directly to the second stage treatment unit.

The supernatant liquor separated from the activated sludge in the #1 settler or clarifying unit passes through channels 22, 23, 24 to the aerator of the second stage treating unit 12 where it is mixed with air or other oxygen containing gas under conditions that promote aerobic decomposition of the organics and form an activated sludge floc.

Aerated liquor containing activated sludge floc passes through channel 25 to the clarifier 13 where it is again maintained under quiescent conditions which permit the activated sludge floc to settle without appreciable elutration and collect at the bottom of the settler. The activated sludge collected in the second stage is continuously removed from the settler through line 26 by the #2 sludge pump 27 and is recycled to the second stage treatment by means of lines 28, 29, 23 and 24.

The effluent from the second stage clarifier 13 is collected and discharged from the system through lines 30. After leaving the system, the effluent can, if desired, be subjected to conventional tertiary treatments (e.g., ion exchange, chemical precipitation, charcoal absorption, reverse osmosis, electrodialysis, etc.) and/or chlorination, or optionally, it can be sent directly to stream without further handling.

The foregoing describes the normal or series operation of a two-stage activated sludge plant such as that of the Murray patent except that the conventional system does not include the splitter, the influent bypass, the relative positions with respect thereto of the first stage sludge return.

As previously noted, this invention involves providing an automatic cross connection that permits the first and second stage units to operate in parallel when the influent flow rate exceeds a predetermined limit and for automatic shift back into series when the influent flow rate returns to normal.

Thus, the splitter box 15 directs all the influent up to a predetermined rate through line 16. If the influent flow rate exceeds the set limit, the excess flow is bypassed around the first stage aerator 10 and is fed directly to the second stage aerator 12.

In the drawing, the overload influent bypass is illustrated by dotted line 31 which joins lines 23, 24 ahead of the aeration zone of the second treatment unit.

In addition and according to this invention, the system is provided with a bypass for the supernatant liquor flowing from the first stage clarifier that permits discharge of all or part of the first stage supernatant to tertiary treatment or discharge to stream as desired.

The supernatant bypass piping and valving can take many different forms, a preferred arrangement is schematically illustrated in the drawing. One opening of a three-way cock or valve 33 is connected to the supernatant discharge line 22, a second opening is connected to line 23 leading to the second treatment unit, and the third opening is connected to bypass line 32. The valve porting being so arranged that, depending on the position of its gate or plug, all flow from line 22 can be stopped, the entire flow from line 22 can be directed either to line 23 or to the bypass line 32, or the total flow from line 22 can be apportioned at any desired ratios, between both lines 23 and 32.

Another arrangement (not illustrated) would involve eliminating the three way valve and placing the throttle valves in lines 32 and 23; the throttle valves being regulated by valve controller one opening as the other closes and vice versa.

A first flow measuring means 35 (for example a conventional flowmeter) is positioned to measure the flow rate of the supernatant discharge through line 22—i.e., at a point ahead of the junction of the supernatant bypass 32 with discharge line 22-23. A second flow measuring means 36 is positioned to measure the flow rate of the effluent through discharge line 30. Flow meters 35, 36 are provided with means for measuring the flow rates in their respective lines and to conventionally transmit signals indicative of the measured flow rates to a conventional rate analyzer mechanism 37 capable of sensing differences in the flow rates being reported by the two flow meters. The flow rate analyzer 37 is desirably combined and connected to 38 in a known manner with a conventional valve control mechanism for controlling and regulating valve 33. The analyzer-controller assembly 37 is adapted to actuate the valve 33 whenever the flow rate at meter 36 differs from the flow rate at meter 35 and bring the flow rates through lines 22 and 30 into the desired balance (usually a 1:1 ratio) established by presetting the flow rate analyzer.

Thus, in the preferred operation of the system, the analyzer is preset so that if the flow rate at meter 35 exceeds the rate at meter 36, the valve 33 will be maintained in a condition whereby all the supernatant from the first stage clarifier will be channeled to flow through line 23 to the second stage aerator—i.e., normal series operation of the two stages. If the flow rate at meter 36 exceeds the rate at meter 35, the analyzer 37 will actuate the valve control mechanism to shift valve 33 so as to bypass all first stage supernatant through line 32, or to bypass sufficient first stage supernatant through bypass line 32 to equalize the flow rates at meters 35, 36. The analyzer setting is also such that the equipment and system are operating in parallel with valve 33 fully open to the bypass, or in a series-parallel hookup with a partial bypass of supernatant through valve 33, a decrease of the influent flow through the line 31 will cause a drop in the flow rate at the #2 flowmeter 36 and analyzer-controller system will be actuated to shift valve 33 so as to permit or increase the flow of supernatant through line 23.

The process and component system as set forth will make it possible to maintain floc in the same condition at up to twice the design average flow since no change is involved in the hydraulic loading in either treatment unit. Furthermore, if the hydraulic flows go even higher, the system will be capable of returning rapidly to its previous state when flows return to normal. Obviously, the overall treatment efficiency will be somewhat reduced during high flows; however, significant treatment efficiency will be retained and a prolonged start up period avoided because the floc will not be lost by elutration.

In the preferred arrangeemnt of a sewage treatment plant, there are preestablished hydraulic gradients between the splitter box and the aerators which permit gravity flow operation, and if, as illustrated in the accompanying drawing, the first stage supernatant discharge 23 and the raw influent bypass 31 are a closed piping system and merge into a common line 24 leading to the second stage aerator, it is important to have a one way check valve in the supernatant discharge line 23 that will prevent bypassed influent from line 31 backing into the supernatant bypass due to the preestablished hydraulic gradient or when the pressure in line 31 exceeds that of line 23. The check valve preferably should be positioned in line 23 between the points of juncture of line 31 to 32 and also positioned in line 23 ahead (in first stage supernatant flow direction) of any juncture with second stage sludge return line 29.

During the operation of the process and system, sludge from the first and second stage clarifiers, in excess of that needed for recycling through the system is intermittently discharged to a digester by means of lines 40 and 41. Valves 42 and 43 are normally set in a closed position and are periodically opened to permit purging of a portion of the settled sludge to the digester. As is conventional, supernatant from the digester can be recycled through the system by merging it with the raw sewage influent ahead of the splitter. Alternatively, it can be passed to tertiary treatment and/or to chlorination prior to discharge to stream.

If, for any reason, the plant must be operated continuously in a parallel hookup over a prolonged period of time, it is desirable to provide a valved bypass (not shown) in sludge return line 29 that permits all of the sludge from the #2 sludge pump to be diverted to merge with the raw sewage influent ahead of the splitter. This equalizes the quantity of activated sludge being recirculated through each unit.

I claim:

1. In a system for treating sewage wherein the raw sewage influent is fed to and passed serially through first stage and second stage treating units each treating unit having an aeration zone in which the sewage is admixed with air or oxygen under conditions to form an activated sludge, and a clarifying zone in which the activated sludge settles and separates from the supernatant liquor, the settled activated sludge from the first stage clarifying zone being collected, recirculated, and mixed with the raw sewage being fed to the first stage aeration zone, the supernatant liquor separated from the activated sludge in the first stage clarifying zone being collected and fed to the second stage aeration zone, the settled activated sludge from the second stage clarifying zone being collected, recirculated and mixed with the supernatant liquor being fed to the second stage aeration zone, and the supernatant liquor separated from the activated sludge in the second stage clarifying zone being collected and discharged from the system; the improvement wherein means for splitting the flow of raw sewage are provided in the sewage influent feed line ahead of the first stage aeration zone, said means providing an influent bypass adapted to divert the portion of the flow of raw sewage influent in excess of a preset and predetermined maximum to the second stage aeration zone, a first flow measuring means adapted to measure the flow rate of the supernatant liquor being fed from the first stage clarifying zone to the second stage aeration zone, a second flow measuring means adapted to measure the flow rate of the supernatant being discharged from the second stage clarifying zone, a valve controlled supernatant bypass to the system discharge connected to the flow path of the first stage supernatant feed to the second stage aeration zone beyond the first flow measuring means and ahead of the second stage aeration zone, a flowrate analyzer adapted to sense differences in the flow rates of the supernatants discharging from the first and second units and set to actuate the supernatant bypass valve whenever the flow rate at the second flow measuring means exceeds the flow rate at the first flow measuring means to thereby decrease the quantity of supernatant being fed from the first stage clarifying zone to the second stage aeration zone in an amount approximately equal to the quantity of raw sewage influent being bypassed by the flow splitting means from the first stage unit to the second stage unit.

2. The system according to claim 1 wherein the settled activated sludge from the first stage unit is recycled and admixed with the raw influent ahead of the means for splitting the flow of raw sewage.

3. In a process for the treatment of sewage wherein the raw sewage influent is fed to and passed serially through first stage and second stage treating units each treating unit having an aeration zone in which the sewage is admixed with air or oxygen under conditions to form an activated sludge, and a clarifying zone in which the activated sludge settles and separates from the supernatant liquor, the settled activated sludge from the first stage clarifying zone being collected, recirculated, and mixed with the raw sewage being fed to the first stage aeration zone, the supernatant liquor separated from the activated sludge in the first stage clarifying zone being collected and fed to the second stage aeration zone, the settled activated sludge from the second stage clarifying zone being collected, recirculated and mixed with the supernatant liquor being fed to the second stage aeration zone, and the supernatant liquor separated from the activated sludge in the second stage clarifying zone being collected and discharged from the system; the improvement which comprises splitting the flow of raw sewage ahead of the first stage aeration zone and diverting that portion thereof that is in excess of a preset and predetermined maximum to the second stage aeration zone, and simultaneously decreasing the quantity of supernatant being fed from the first stage clarifying zone to the second stage aeration zone in an amount approximately equal to the quantity of raw sewage influent being by-passed from the first stage unit to the second stage unit.

4. The process according to claim 3 wherein the settled activated sludge from the first stage unit is recycled and admixed with the raw influent ahead of the means for splitting the flow of raw sewage.

5. The system according to claim 1 wherein the flow rate analyzer is further adapted and set to actuate the supernatant bypass valve whenever the flow rate at the first flow measuring means exceeds the flow rate at the second flow measuring means to thereby increase the quantity of supernatant being fed from the first stage clarifying zone to the second stage aeration zone in an amount necessary to provide for substantially equal flow rates at the first and second flow measuring means.

6. The process of claim 3 and further characterized by increasing the quantity of supernatant being fed from the first stage clarifying zone to the second stage aeration zone in an amount approximately equal to any decrease in the flow of raw sewage influent being split and bypassed to the second stage aeration zone.

References Cited
UNITED STATES PATENTS

| | | | |
|---|---|---|---|
| 1,717,780 | 6/1929 | Imhoff | 210—195 |
| 3,186,939 | 6/1965 | Murray | 210—7 |
| 3,390,077 | 6/1968 | Forrest | 210—6 |
| 3,403,095 | 9/1968 | Chipperfield et al. | 210—101 |

REUBEN FRIEDMAN, Primary Examiner

T. G. WYSE, Assistant Examiner

U.S. Cl. X.R.

210—101